United States Patent [19]

Salter, Jr.

[11] 4,022,480
[45] May 10, 1977

[54] NECK SEAL

[75] Inventor: Lowell S. Salter, Jr., Shrewsbury, Mass.

[73] Assignee: Morgan Construction Company, Worcester, Mass.

[22] Filed: Oct. 7, 1975

[21] Appl. No.: 620,492

[52] U.S. Cl. .................................. 277/95; 277/63; 277/206 R
[51] Int. Cl.² ........................................ F16J 15/34
[58] Field of Search ................. 277/95, 56, 59, 63, 277/206, 82, 25

[56] References Cited
UNITED STATES PATENTS

| | | | |
|---|---|---|---|
| 2,210,823 | 8/1940 | Victor et al. | 277/25 |
| 2,945,708 | 7/1960 | Stephens | 277/82 |
| 3,545,774 | 12/1970 | Rickley | 277/95 |

Primary Examiner—Richard E. Aegerter
Assistant Examiner—L. Footland
Attorney, Agent, or Firm—Thompson, Birch, Gauthier & Samuel

[57] ABSTRACT

A neck seal is disclosed for use on a roll neck in a rolling mill. The neck seal has a flexible circular body with a pair of axially spaced resilient flanges extending radially therefrom. At least one and preferably both of the resilient flanges has a first annular section extending radially outwardly from the seal body to an intermediate peripheral shoulder, and a second annular section extending inwardly from the peripheral shoulder back towards the seal body.

6 Claims, 4 Drawing Figures

NECK SEAL

BACKGROUND OF THE INVENTION

This invention relates generally to the art of seals, and is concerned in particular with neck seals of the type employed on roll necks in rolling mills.

In a typical rolling mill installation, a roll neck is journalled for rotation in an oil film bearing. The bearing includes a sleeve keyed or otherwise fixed to the roll neck for rotation therewith. The sleeve is surrounded by and supported within a non-rotatable bushing which is in turn contained in a bearing chock. An oil film is maintained between the sleeve and the bushing during operation of the mill. A seal assembly is employed both to prevent loss of oil from the bearing, and also to prevent exterior contaminants such as cooling water, mill scale, etc. from penetrating into the bearing.

Typical of the prior art seal assemblies which have heretofore been developed are those described in U.S. Pat. Nos. 2,868,574; 3,093,425; 3,330,567; 3,545,774 and 3,382,021, all assigned to the same assignee as that of the present invention. These prior art seal assemblies include a neck seal having a flexible circular body mounted on a tapered transition section of the roll neck, with resilient flanges which extend radially outwardly from the seal body. The ends of the resilient flanges are adapted to frictionally contact surrounding shoulders on a non-rotatable seal end plate. Oil is retained in the bearing by the seal provided at the interface between one of the rotating resilient seal flanges and the non-rotatable seal end plate shoulder in contact therewith. Likewise, contaminants are excluded from the bearing by the seal provided at the interface between the other of the rotating resilient seal flanges and its associated seal end plate shoulder. As the resilient flanges of the neck seal wear, seal integrity is gradually compromised, eventually resulting in the necessity to replace the neck seal.

While the above described conventional seal assemblies have operated for many years in a generally satisfactory manner, there have been several problems associated with their use. One such problem relates to the fact that even when the neck seals are new, some leakage may be experienced because of the inability of the resilient flanges to fully compensate for axial and/or radial misalignment of other associated components. Also, rapidity of wear of the resilient flanges on the neck seals, causing eventual loss of seal integrity and necessitating frequent replacements of the neck seals, has been a continuing problem which is expected to become more severe as mill speeds gradually increase.

Accordingly, a general object of the present invention is the provision of an improved neck seal having the capability of either obviating or at least substantially minimizing the problems mentioned above.

A more specific object of the present invention is the provision of an improved neck seal which is capable of more extended periods of use under high speed operating conditions.

Another object of the present invention is the provision of a neck seal having resilient flanges which each have multiple areas of sealing contact with adjacent surfaces of the seal end plate.

A further object of the present invention is to increase the number of areas of sealing contact between the neck seal and its surrounding seal end plate without adversely affecting the ability of the seal assembly to compensate for axial shifting of the roll relative to its bearing chock.

Still another object of the present invention is to provide resilient flanges on the neck seal which make more efficient use of the centrifugal forces developed during roll rotation.

SUMMARY OF THE INVENTION

According to the present invention there is provided an improved neck seal for use on a roll neck in a rolling mill. The neck seal has a flexible circular body with a pair of axially spaced resilient flanges extending radially therefrom. In use, the neck seal is mounted on a roll neck for rotation therewith at a location surrounded by non-rotatable seal end plate. The seal end plate has a rigid flange extending radially inwardly towards the roll neck, and shoulders which extend in opposite directions from the base of the aforesaid radial flange. At least one and preferably both of the resilient flanges on the neck seal is comprised of a first annular section extending radially outwardly from the seal body to an intermediate shoulder which is in frictional contact with one of the shoulders on the seal end plate, and a second annular section extending inwardly from the peripheral shoulder back towards the seal body to frictionally contact the side of the radial flange on the seal end plate. With this modification, the resilient flange on the neck seal has two contact or sealing areas with the seal end plate, rather than the single contact area provided by the prior art seals. As will hereinafter be described in more detail, this doubling of the number of contact areas will improve the neck seal's ability to prevent leakage and to remain in service over more extended periods of time, without in any way detracting from its ability to compensate for axial shifting of the work roll during normal operation of the mill.

BRIEF DESCRIPTION OF THE DRAWINGS

An embodiment of the invention will now be described by way of example only, with reference to the accompanying drawings wherein.

DESCRIPTION OF THE PREFERRED EMBODIMENT

Figure 1:
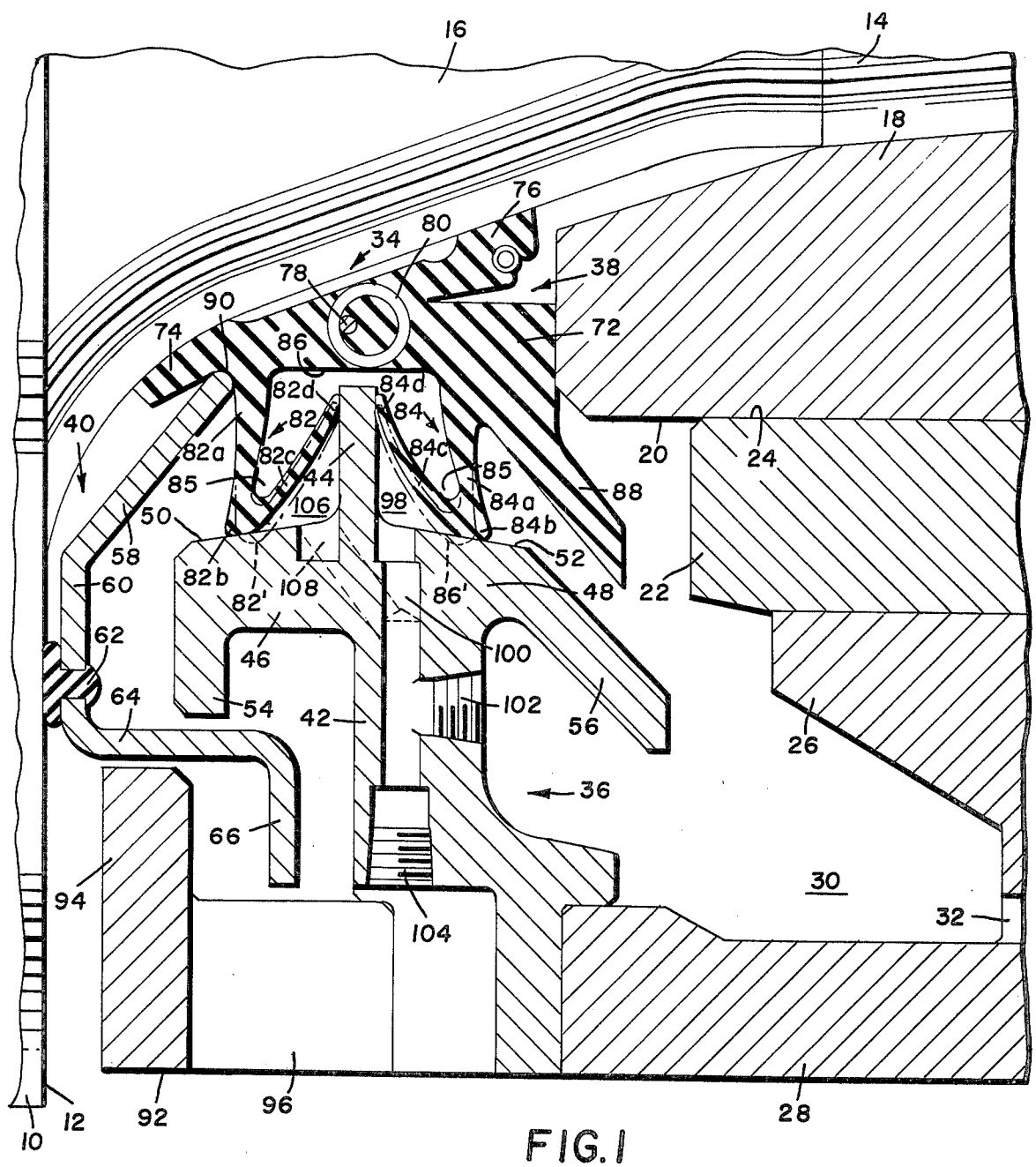
FIG. 1 is an enlarged sectional view showing a seal assembly which includes a neck seal embodying the concepts of the present invention.

Referring initially to FIG. 1, a roll is shown at 10 having an end face 12 and a roll neck 14 connected to the roll 10 by an intermediate tapered transition section 16. The roll neck 14 has mounted thereon a sleeve 18 having a cylindrical outer bearing surface 20. The sleeve 18 is fixed to the roll neck 14 by conventional means, for example a key (not shown). Sleeve 18 is journalled for rotation in a fixed bushing 22 having an interior cylindrical bearing surface 24. The bushing 22 is carried within and fixed relative to a roll chock 26. It will thus be seen that sleeve 18 rotates with the roll, while the chock 26 and the bushing 22 are stationary.

Oil in flooding quantity is fed continuously between the bearing surfaces 20 and 24. A circular extension 28 of the roll chock 26 provides at its bottom portion a sump 30 in which the oil emerging from the bearing is continuously collected. The oil is drawn away from the sump through a suitable piping connection 32 to be recycled in a conventional manner back to the bearing surfaces.

During operation of the mill, a liquid coolant is continuously flooded over the roll 10 and down over the face 12. The coolant normally picks up particulate matter such as dirt, mill scale, etc. The liquid coolant, mill scale, dirt, etc. will hereinafter be collectively referred to as "contaminants." In spite of the centrifugal forces which tend to throw the contaminants off of rotating surfaces of the roll, some of the contaminants tend to flow along the roll neck in the direction of the bearing. Accordingly, a seal assembly generally indicated at 34 is employed for the dual purpose of retaining the lubricating oil in the bearing, and also for preventing the contaminants from penetrating into the bearing.

In the embodiment herein being employed for illustrative purposes, the seal assembly 34 is made up of the three main components, i.e., a circular seal end plate 36; a neck seal 38, and an inner seal ring 40. The seal end plate 36 is fixed to the circular extension 28 of the chock 26 and is thus held in a non-rotatable relationship relative to the roll 10. Seal end plate 36 has an annular body 42 and an inwardly extending rigid radial flange 44. Other flanges 46, 48 provide shoulders 50, 52 which extend in opposite directions from the base of flange 44. Flange 46 has a radially outwardly extending extension 54, and flange 48 likewise has an angularly disposed extension 56.

The inner seal ring 40 consists of a conical inner part 58, an annular part 60 which engages the end face 12 of the roll through a series of interposed angularly separated spacers 62, and a generally cylindrical part 64 terminating in a radial flange 66.

The components thus far described are conventional and well known to those skilled in the art. The present invention resides in the neck seal 38 which is employed in conjunction with the seal end plate 36 and the inner seal ring 40.

The neck seal 38 includes a flexible circular body 72 having circular end portions 74 and 76 which when in position on the transition section 16 of the roll neck, are well stretched to make tight sealing engagement therewith. The neck seal typically is molded of synthetic rubber-like material, and the body 72 may if desired be internally reinforced by conventional means, for example the combination of a cable 78 and spring 80 as taught by U.S. Pat. No. 3,330,567. Neck seal 38 is further provided with a pair of external resilient flanges generally indicated at 82, 84. Flange 82 includes a first annular section 82a which extends radially outwardly from the seal body 72 to an intermediate peripheral shoulder 82b with a second annular section 82c which extends from the peripheral shoulder 82b inwardly back towards the seal body 72. Flange 84 is similarly comprised of a first annular section 84a, a peripheral intermediate shoulder 84b and a second annular section 84c. The flanges 82, 84 are arranged in an axially spaced relationship on the seal body 72, with an intermediate external cylindrical surface 86 extending therebetween. The second annular sections 82c, 84c are disposed at an angle relative to their associated first annular sections 82a, 84a, thus forming internal grooves 85. The inner edges 82d, 84d of the second annular sections 82c, 84c are located generally proximate to but spaced radially from the middle of the intermediate external cylindrical surface 86.

When the neck seal 38 is mounted on the roll neck 16 within the circular seal end plate 36, the flanges 82, 84 are deflected from their normal unrestrained positions as shown by the dotted lines at 82', 84' in FIG. 1 to the operative positions shown by the solid lines. In this condition, the intermediate peripheral shoulders 82b, 84b are in frictional contact with the adjacent shoulders 50, 52 of the seal end plate. In addition the inner edges 82d, 84d of the second annular sections 82c, 84c are in frictional contact with opposite sides of the radial flange 44 on the seal end plate 36.

The neck seal 38 may, if desired, be additionally provided with a third flange 88 which extends angularly from the seal body 72 in spaced generally parallel relationship to the extension 56 on the seal end plate 36. The conical inner part 58 of the inner seal ring 40 contacts the body portion 72 of the neck seal 28 at the juncture 90 between end portion 74 and resilient flange 82. The seal end plate 36 may also be additionally provided with a circular outer seal ring 92 having an inturned flange 94 and a large drain 96.

The operation of the seal assembly 34 will now be explained. The rotatable components include the roll 10 and its neck portions 14, 16, together with the sleeve 18, neck seal 38 and inner seal ring 40. The non-rotatable components include the bushing 22, chock 26, seal end plate 36 and outer seal ring 92. With reference initially to the "bearing side" of the seal, it will be understood that oil is constantly being expelled from between the bearing surfaces 20, 24. Some of the expelled oil will simply fall by gravity or run down the stationary walls of the fixed parts into the sump 30. Some of the expelled oil will be contacted by the rotating third flange 88 on the neck seal 38 and directed into the sump. However, some of the expelled oil will eventually work its way out along flange 56. A major portion of this oil will be turned back by the seal provided at the interface between the rotating peripheral shoulder 84b and the stationary shoulder 52. Some oil may succeed in passing beneath shoulder 84b to continue along shoulder 52 and thence along flange 44. The second sealing surface provided between the inner edge 84d of annular section 84c and the side of flange 44 will prevent this oil from continuing along flange 44. Any oil reaching this point will be turned back and collected temporarily in the chamber 98 formed between the flange 44, shoulder 52 and the annular section 84c of resilient flange 84. A drain 100 in the seal end plate 36 communicates with chamber 98 and with ports 102 and 104. Port 104 can be used to monitor the bearing to determine whether any leakage is being experienced at the seal interface between shoulders 84b and 52. If port 104 is closed off, as for example by means of a threaded plug, then any such leakage will simply be returned via port 102 to the sump 30.

On the "roll side" of the seal, the contaminants are for the most part thrown off by centrifugal force. A major portion of any such contaminants which succeed in passing by flange 94 will be thrown off by radial flange 66 to be ultimately discharged through drain 96. If some contaminants do succeed in reaching the inner concave side of the inner sealing ring 40, then the contact area between rotating peripheral shoulder 82b and stationary shoulder 50 will provide a first sealing barrier. A second sealing barrier will again be provided at the interface between the rotating inner edge 82d of annular section 82c and the side of stationary flange 44. Any contaminants turned back by this second sealing interface will be temporarily collected in a second chamber 106 before expelled through a separate drain 108 in the seal end plate 36.

It will thus be seen that the neck seal 38 of the present invention provides a distinct advantage over the neck seals of the prior art. This advantage lies primarily in the fact that the resilient flanges 82, 84 each have multiple areas of contact with cooperating stationary surfaces of the seal end plate 36. The additional areas of contact are provided between the inner edges 82d, 84d of the second annular sections 82c, 84c and the sides of the stationary radial flange 44 on the seal end plate. These additional contact sealing surfaces insure that any leakage of either contaminants or lubricant experienced beneath the rotating peripheral shoulders 82b, 84b will be blocked and turned back.

Under certain circumstances, it may not be necessary for both resilient flanges 82, 84 to be identical, in which event only one flange need be comprised of cooperating first and second annular sections. It is also preferable although strictly not necessary to have the first annular sections 82a, 84a gradually diminish in thickness from the seal body 72 towards the peripheral shoulders 82b, 84b, and to have the second annular sections 82c, 84c gradually increase in thickness from their outer edges 82d, 84d towards the peripheral shoulders 82b, 84b. The degree of these tapers and the relative thicknesses employed can be varied to obtain optimum sealing characteristics.

Figure 2:
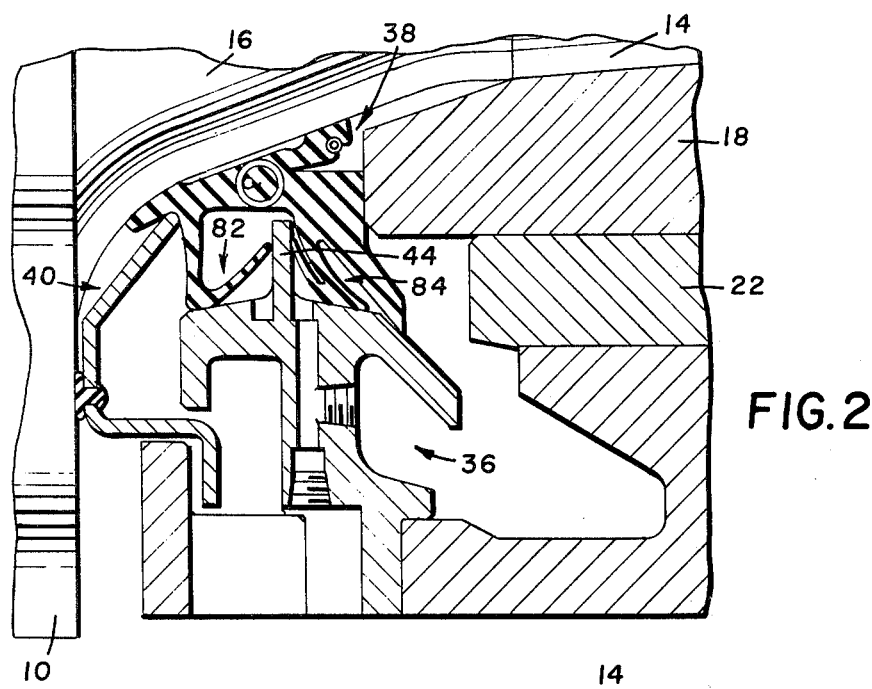
FIGS. 2 and 3 are sectional views similar to FIG. 1, on a reduced scale, showing the ability of the neck seal to compensate for axial shifting of the roll; and, FIG. 4 is an enlarged partial sectional view showing the use of additional restraining means in the form of garter springs for radially positioning the resilient flanges of the neck seal.
Figure 3:
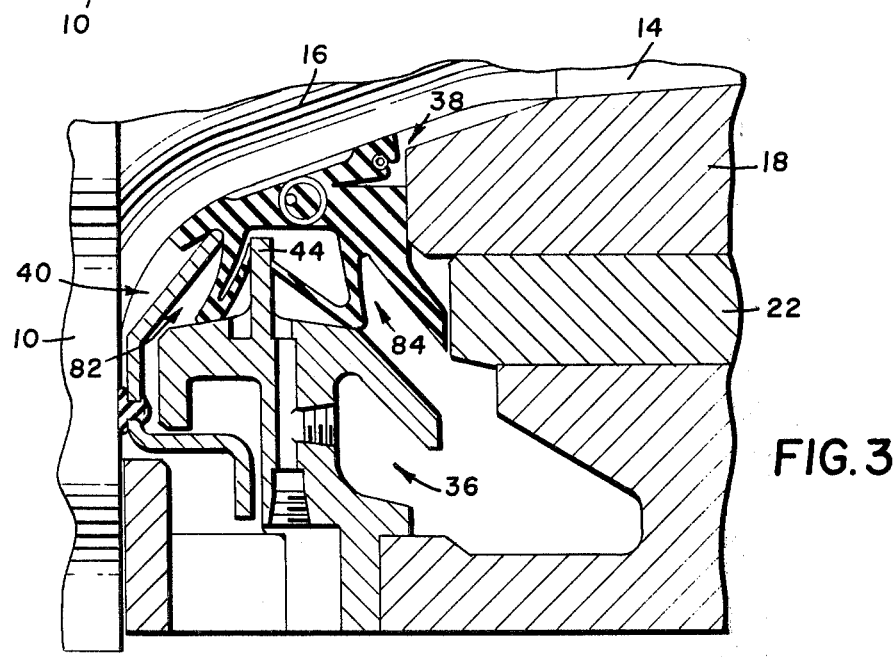

FIG. 2 illustrates a condition wherein the roll 10 has undergone a maximum axial shifting in one direction (to the left) relative to the bearing chock. FIG. 3 illustrates another condition wherein the roll has undergone a maximum axial shifting in the opposite direction (to the right) relative to the bearing chock. The resilient flanges 82, 84 are fully capable of accommodating the entire range of such axial shifting without in any way compromising seal integrity. The inner edges 82d, 84d of the second annular sections 82c, 84c remain in sealing contact with the sides of the flange 44 and the peripheral shoulders 82b, 84b remain in sealing contact with the shoulders 50, 52. The advantage of having an increased number of sealing contact areas between the neck seal 38 and the seal end plate 36 is achieved without shortening the length of cylindrical surface 86 between the resilient flanges 82, 84. By keeping the axial length of surface 86 at a maximum, a corresponding maximum axial shift of the roll can be accommodated.

By employing inwardly extending angularly disposed second annular sections 82c, 84c, another advantage is realized in that the centrifugal forces developed during rotation of the neck seal tend to force the inner edges 82d, 84d outwardly into contact with the sides of the flange 44. With this arrangement, centrifugal forces tend to improve rather than impair the sealing effect provided at the interface between the rotating inner edges 82d, 84d and sides of the stationary flange 44. Also, any wear of the inner edges 82d, 84d is automatically compensated for by the fact that these edges are constantly urged against the sides of the flange 44 by centrifugal forces developed during mill operation.

Figure 4:
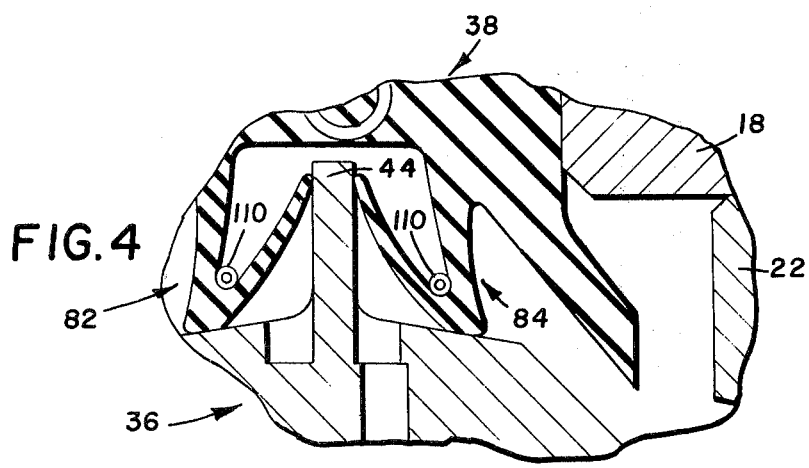

With reference to FIG. 4, there may be circumstances where it would be beneficial to provide additional means for urging the intermediate peripheral shoulders 82b, 84b into contact with the shoulders 50, 52 of the seal end plate. This can be accomplished by locating tensioning elements such as small diameter garter springs 110 in the grooves 85 formed between the first annular sections 82a, 84a and their associated second annular sections 82c, 84c.

It is my intention to cover all changes and modifications to the embodiment herein chosen for purposes of disclosure which do not depart from the spirit and scope of the invention.

I claim:

1. An integrally fabricated neck seal comprising: a circular flexible seal body adapted to be mounted on a roll neck for rotation therewith; a pair of axially spaced resilient external flanges on said seal body, each of said flanges having a first annular section extending radially outwardly from said seal body to a radially outwardly facing peripheral shoulder, at least one of said flanges being further provided with a second annular section extending inwardly from its peripheral shoulder towards said seal body, the first and second annular sections of the said one flange being arranged in a non-parallel relationship to define a groove therebetween.

2. The seal as claimed in claim 1 wherein said seal body is provided with an exterior cylindrical surface extending axially between said first annular sections, each of said flanges having second annular sections extending from said peripheral shoulders angularly inwardly relative to said first annular sections towards the middle of said cylindrical surface.

3. The seal as claimed in claim 1 wherein said first annular section gradually diminishes in thickness from said seal body towards said peripheral shoulder, and wherein said second annular section gradually increases in thickness from the inner edge thereof towards said peripheral shoulder.

4. An integrally fabricated neck seal comprising: a circular flexible seal body adapted to be mounted on a roll neck, a pair of resilient external flanges on said seal body, said external flanges being axially spaced by an exterior cylindrical surface on said seal body, said flanges each having a first annular section extending radially outwardly from said seal body to an intermediate peripheral shoulder, with a second annular section extending inwardly from said peripheral shoulder towards said seal body, and with the ends of said second annular sections being spaced both axially from each other, and radially from said cylindrical surface.

5. In a rolling mill, for use with a roll having a roll neck joined to a roll barrel by a tapered transition section, the said roll neck being rotatably supported in a lubricated bearing of the type which includes a sleeve fixed relative to the roll neck for rotation therewith within other non-rotatable bearing components, a seal assembly for retaining the bearing lubricant in the bearing and for excluding external contaminants from the bearing, said seal assembly comprising: an integrally fabricated neck seal having flexible seal body adapted to be mounted on said tapered transition section for rotation therewith, with a pair of axially spaced external resilient flanges on said seal body; a stationary seal end plate surrounding said neck seal, said seal end plate having a rigid flange extending radially inwardly between said resilient flanges, with the end of said rigid flange being spaced radially from said seal body, and with other rigid flanges forming shoulders surrounding said resilient flanges and extending in opposite directions from the base of said rigid flange, each of said resilient flanges having a first annular section extending radially outwardly from said seal body to a radially outwardly facing peripheral shoulder in contact with one of the shoulders on said other rigid flanges, at least one of said resilient flanges having a second annular section extending inwardly from its peripheral shoulder, the inner edge of said second annular section being in contact with the rigid flange on said seal end plate.

6. The seal assembly as claimed in claim 5 wherein said second annular section cooperates with said rigid flange and the shoulder contacted by said peripheral shoulder to define an enclosed circular chamber, and wherein said seal end plate is provided with drainage means in communication with said chamber for removing liquids therefrom.

* * * * *